(12) United States Patent
Kim et al.

(10) Patent No.: US 10,803,333 B2
(45) Date of Patent: Oct. 13, 2020

(54) METHOD AND DEVICE FOR EGO-VEHICLE LOCALIZATION TO UPDATE HD MAP BY USING V2X INFORMATION FUSION

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/725,181

(22) Filed: Dec. 23, 2019

(65) Prior Publication Data
US 2020/0242378 A1 Jul. 30, 2020

Related U.S. Application Data

(60) Provisional application No. 62/798,686, filed on Jan. 30, 2019.

(51) Int. Cl.
*G06K 9/00* (2006.01)
*H04W 4/40* (2018.01)
(Continued)

(52) U.S. Cl.
CPC ....... *G06K 9/00825* (2013.01); *G06K 9/3233* (2013.01); *G06K 9/6217* (2013.01);
(Continued)

(58) Field of Classification Search
CPC ............ G06K 9/00825; G06K 9/6217; G06K 9/3233; G06T 7/50; G06T 11/20; G06T 2210/12; H04W 4/40
See application file for complete search history.

(56) References Cited

U.S. PATENT DOCUMENTS 9,946,960 B1 4/2018 Kim et al.
2015/0239482 A1* 8/2015 Green ................. B61L 15/0063
246/122 R
(Continued)

FOREIGN PATENT DOCUMENTS

WO 2018015811 A1 1/2018

OTHER PUBLICATIONS

Lee et. al., GPS/DR Error Estimation for Autonomous Vehicle Localization, sensors issn 1424-8220, Aug. 2015, pp. 20779-20798.*
(Continued)

*Primary Examiner* — John B Strege
(74) *Attorney, Agent, or Firm* — Husch Blackwell LLP

(57) ABSTRACT

A method for calculating exact location of a subject vehicle by using information on relative distances is provided. And the method includes steps of: (a) a computing device, if a reference image is acquired through a camera on the subject vehicle, detecting reference objects in the reference image; (b) the computing device calculating image-based reference
(Continued)

distances between the reference objects and the subject vehicle, by referring to information on reference bounding boxes, corresponding to the reference objects, on the reference image; (c) the computing device (i) generating a distance error value by referring to the image-based reference distances and coordinate-based reference distances, and (ii) calibrating subject location information of the subject vehicle by referring to the distance error value.

20 Claims, 4 Drawing Sheets

(51) Int. Cl.
*G06T 7/50* (2017.01)
*G06K 9/62* (2006.01)
*G06K 9/32* (2006.01)
*G06T 11/20* (2006.01)

(52) U.S. Cl.
CPC ............... *G06T 7/50* (2017.01); *G06T 11/20* (2013.01); *H04W 4/40* (2018.02); *G06T 2210/12* (2013.01)

(56) References Cited

U.S. PATENT DOCUMENTS

| | | | |
|---|---|---|---|
| 2016/0210525 A1* | 7/2016 | Yang | G06K 9/0063 |
| 2017/0038477 A1 | 2/2017 | Schmid | |
| 2018/0045519 A1 | 2/2018 | Ghadiok et al. | |
| 2018/0047288 A1 | 2/2018 | Cordell et al. | |
| 2018/0364717 A1* | 12/2018 | Douillard | G06T 7/187 |
| 2019/0049566 A1* | 2/2019 | Adams | G01S 17/87 |

OTHER PUBLICATIONS

Zindler et al. Vehicle Ego-localization in autonomous lane-keeping evasive maneuvers, International federation of Automatic Control, 2016.*

* cited by examiner

METHOD AND DEVICE FOR EGO-VEHICLE LOCALIZATION TO UPDATE HD MAP BY USING V2X INFORMATION FUSION

CROSS REFERENCE OF RELATED APPLICATION

This application claims the benefit of priority to U.S. Provisional Patent Application No. 62/798,686, filed Jan. 30, 2019, the entire contents of which are incorporated herein by reference.

FIELD OF THE DISCLOSURE

The present disclosure relates to a method and a device for use with an autonomous vehicle; and more particularly, to the method and the device for an ego-vehicle localization by using a V2X information fusion.

BACKGROUND OF THE DISCLOSURE

One of important components of autonomous driving is an HD Map, i.e., a High-Definition Map. It is because, if an autonomous driving system is operated by using only information acquired by sensors installed thereon, the autonomous driving system may not be able to provide a driving strategy including big-pictured long-termed plans. Herein, it may cause inefficiency and hazardous situations when information acquired by the sensors are not accurate.

However, a high-quality HD Map, which is very important for the autonomous driving as described above, cannot be made easily because it is hard to map information acquired by an ego-vehicle onto a correct location of the HD Map due to an imprecise GPS module installed thereon. Therefore, the HD Map may not be correct even if the ego-vehicle acquires information of high quality.

Also, even when the HD Map has been generated precisely, in case a location of an autonomous vehicle, which is performing the autonomous driving by using the HD Map, is not detected properly, it may cause problems. Thus, both when generating the HD Map and when using the HD Map, it is important to localize locations of vehicles, but so far it has not been studied much.

SUMMARY OF THE DISCLOSURE

It is an object of the present disclosure to solve all the aforementioned problems.

It is an object of the present disclosure to provide a method for a localization of an ego-vehicle for updating an HD Map by using a V2X information fusion, to thereby calculate a more precise location of the ego-vehicle, which allows information acquired by the ego-vehicle to be mapped onto the HD Map more correctly.

It is another object of the present disclosure to provide a method for a localization of an autonomous vehicle performing an autonomous driving by using the HD Map, to thereby calculate a more precise location of the autonomous vehicle, which allows the autonomous driving to be performed more properly.

In accordance with one aspect of the present disclosure, there is provided a method for calculating exact location of a subject vehicle by using information on relative distances, including steps of: (a) a computing device, which interworks with the subject vehicle, if at least one reference image is acquired through at least one camera on the subject vehicle, detecting one or more reference objects in the reference image, by applying at least one object detection operation to the reference image; (b) the computing device calculating each of one or more image-based reference distances between each of the reference objects and the subject vehicle, by referring to information on each of reference bounding boxes, corresponding to each of the reference objects, on the reference image; (c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value.

As one example, at the step of (c), the computing device generates the distance error value by using a following formula:

$$Error_D = \sum_{k=1}^{N} w_k (D_{i_k} - D_{c_k})^2$$

wherein $D_{i_k}$ denotes one of the image-based reference distances corresponding to a k-th reference object among the reference objects, $D_{c_k}$ denotes one of the coordinate-based reference distances corresponding to the k-th reference object, $w_k$ denotes a weight for the k-th object, and N denotes the number of the reference objects.

As one example, at the step of (b), the computing device calculates the image-based reference distances by applying at least one image distance estimation operation, which uses information on parameters of the camera, to the reference bounding boxes, and wherein (i) one or more (1-1)-st specific image-based reference distances, among the image-based reference distances, are generated by applying at least one (1-1)-st specific image distance estimation operation, which further uses (1-1)-st specific reference object height information acquired through V2X communications between the subject vehicle and one or more (1-1)-st specific reference objects among the reference objects, to (1-1)-st specific reference bounding boxes, and (ii) one or more (1-2)-nd specific image-based reference distances, among the image-based reference distances, are generated by applying at least one (1-2)-nd specific image distance estimation operation, which further uses information on a reference point in the reference image, to (1-2)-nd specific reference bounding boxes.

As one example, the (1-1)-st specific image distance estimation operation is performed by using a following formula:

$$D = \frac{f \times VH}{h}$$

wherein D denotes one of the (1-1)-st specific image-based reference distances, f denotes a focal length of the camera, VH denotes a piece of the (1-1)-st specific reference object height information corresponding to one of the (1-1)-st specific reference objects, and h denotes an apparent height of said one of the (1-1)-st specific reference objects on the reference image.

As one example, the (1-2)-nd specific image distance estimation operation is performed by using a following formula:

$$D = \frac{f \times H}{|b - cy|}$$

wherein D denotes one of the (1-2)-nd specific coordinate-based reference distances, f denotes a focal length of the camera, H denotes a height of the camera, and |b−cy| denotes an apparent distance, on the reference image, between the reference point and a lower boundary of one of (1-2)-nd specific reference bounding boxes corresponding to one of (1-2)-nd specific reference objects.

As one example, (i) one or more (2-1)-st specific coordinate-based reference distances, among the coordinate-based reference distances, are generated by referring to the subject location information and (2-1)-st specific reference object location information acquired through V2X communications between the subject vehicle and one or more (2-1)-st specific reference objects among the reference objects, and (ii) one or more (2-2)-nd specific coordinate-based reference distances, among the coordinate-based reference distances, are generated by referring to the subject location information and (2-2)-nd specific reference object location information which has been acquired from a database.

As one example, at the step of (a), the computing device applies the object detection operation to the reference image by instructing a Convolutional Neural Network (CNN) to apply at least one convolutional operation, at least one Region-Of-Interest (ROI) pooling operation and at least one Fully-Connected (FC) network operation to the reference image in an order thereof.

As one example, at the step of (c), the computing device calibrates the subject location information to generate calibrated subject location information which makes its corresponding distance error value smallest, by repeating processes of (i) adjusting the subject location information, (ii) re-calculating the distance error value by using the adjusted subject location information, and (iii) re-adjusting the adjusted subject location information by referring to information on whether the re-calculated distance error value has become smaller or not.

As one example, at the step of (c), the computing device, while storing update information to be used for updating a High-Definition Map (HD Map), records information on locations where the update information has been acquired, by referring to the calibrated subject location information.

As one example, the reference objects include at least part of (i) one or more mobile objects capable of a V2X communication and (ii) one or more fixed objects, (ii-1) which are capable of the V2X communication or (ii-2) whose information is stored in a database, and wherein the reference objects include at least part of one or more traffic signs, one or more traffic lights, one or more road markings and one or more surrounding vehicles located closer than a threshold from the subject vehicle.

As one example, at the step of (c), the computing device calculates a location, on a High-Definition Map (HD Map), of the subject vehicle by referring to the calibrated subject location information, and acquires information, from the HD Map, on one or more objects located closer than a threshold from the subject vehicle, to thereby support an autonomous driving of the subject vehicle.

In accordance with another aspect of the present disclosure, there is provided a device for calculating exact location of a subject vehicle by using information on relative distances, including: at least one memory that stores instructions; and at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value.

As one example, at the process of (III), the processor generates the distance error value by using a following formula:

$$Error_D = \sum_{k=1}^{N} w_k (D_{i_k} - D_{c_k})^2$$

wherein $D_{i_k}$ denotes one of the image-based reference distances corresponding to a k-th reference object among the reference objects, $D_{c_k}$ denotes one of the coordinate-based reference distances corresponding to the k-th reference object, $w_k$ denotes a weight for the k-th object, and N denotes the number of the reference objects.

As one example, at the process of (II), the processor calculates the image-based reference distances by applying at least one image distance estimation operation, which uses information on parameters of the camera, to the reference bounding boxes, and wherein (i) one or more (1-1)-st specific image-based reference distances, among the image-based reference distances, are generated by applying at least one (1-1)-st specific image distance estimation operation, which further uses (1-1)-st specific reference object height information acquired through V2X communications between the subject vehicle and one or more (1-1)-st specific reference objects among the reference objects, to (1-1)-st specific reference bounding boxes, and (ii) one or more (1-2)-nd specific image-based reference distances, among the image-based reference distances, are generated by applying at least one (1-2)-nd specific image distance estimation operation, which further uses information on a reference point in the reference image, to (1-2)-nd specific reference bounding boxes.

As one example, the (1-1)-st specific image distance estimation operation is performed by using a following formula:

$$D = \frac{f \times VH}{h}$$

wherein D denotes one of the (1-1)-st specific image-based reference distances, f denotes a focal length of the camera, VH denotes a piece of the (1-1)-st specific reference object height information corresponding to one of the (1-1)- st specific reference objects, and h denotes an apparent height of said one of the (1-1)-st specific reference objects on the reference image.

As one example, the (1-2)-nd specific image distance estimation operation is performed by using a following formula:

$$D = \frac{f \times H}{|b - cy|}$$

wherein D denotes one of the (1-2)-nd coordinate-based reference distances, f denotes a focal length of the camera, H denotes a height of the camera, and |b−cy| denotes an apparent distance, on the reference image, between the reference point and a lower boundary of one of (1-2)-nd specific reference bounding boxes corresponding to one of the (1-2)-nd specific reference objects.

As one example, (i) one or more (2-1)-st specific coordinate-based reference distances, among the coordinate-based reference distances, are generated by referring to the subject location information and (2-1)-st specific reference object location information acquired through V2X communications between the subject vehicle and one or more (2-1)-st specific reference objects among the reference objects, and (ii) one or more (2-2)-nd specific coordinate-based reference distances, among the coordinate-based reference distances, are generated by referring to the subject location information and (2-2)-nd specific reference object location information which has been acquired from a database.

As one example, at the process of (I), the processor applies the object detection operation to the reference image by instructing a Convolutional Neural Network (CNN) to apply at least one convolutional operation, at least one Region-Of-Interest (ROI) pooling operation and at least one Fully-Connected (FC) network operation to the reference image in an order thereof.

As one example, at the process of (III), the processor calibrates the subject location information to generate calibrated subject location information which makes its corresponding distance error value smallest, by repeating processes of (i) adjusting the subject location information, (ii) re-calculating the distance error value by using the adjusted subject location information, and (iii) re-adjusting the adjusted subject location information by referring to information on whether the re-calculated distance error value has become smaller or not.

As one example, at the process of (III), the processor, while storing update information to be used for updating a High-Definition Map (HD Map), records information on locations where the update information has been acquired, by referring to the calibrated subject location information.

As one example, the reference objects include at least part of (i) one or more mobile objects capable of a V2X communication and (ii) one or more fixed objects, (ii-1) which are capable of the V2X communication or (ii-2) whose information is stored in a database, and wherein the reference objects include at least part of one or more traffic signs, one or more traffic lights, one or more road markings and one or more surrounding vehicles located closer than a threshold from the subject vehicle.

As one example, at the process of (III), the processor calculates a location, on a High-Definition Map (HD Map), of the subject vehicle by referring to the calibrated subject location information, and acquires information, from the HD Map, on one or more objects located closer than a threshold from the subject vehicle, to thereby support an autonomous driving of the subject vehicle.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
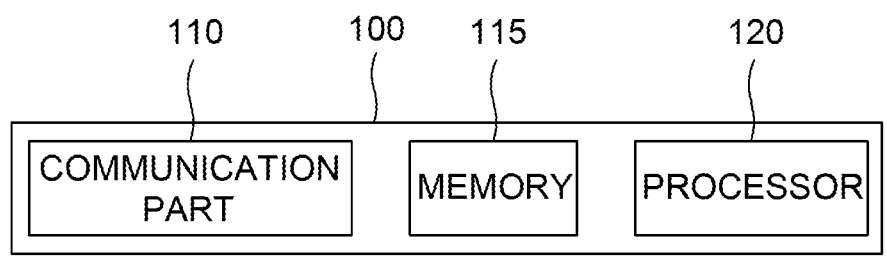
FIG. 1 is a drawing schematically illustrating a configuration of a computing device performing a method for an ego-vehicle localization by using a V2X information fusion in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device performing a method for an ego-vehicle localization by using a V2X information fusion in accordance with one example embodiment of the present disclosure.

By referring to FIG. 1, the computing device 100 may include a communication part 110, a memory 115 and a processor 120. Processes of input/output and computations of the computing device 100 may be respectively performed by the communication part 110 and the processor 120. However, detailed communication schematics between the communication part 110 and the processor 120 are omitted in FIG. 1. Herein, the memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Such computing device 100 may be installed to a subject vehicle, or a server interworking with the subject vehicle. Herein, the subject vehicle may be a vehicle for acquiring information to be used for updating a High-Definition Map (HD Map) or an autonomous vehicle performing an autonomous driving by using the HD Map.

So far the configuration of the computing device 100 in accordance with one example embodiment of the present disclosure has been explained. Hereinafter, the method for the ego-vehicle localization will be explained, by referring to FIG. 2.

Figure 2:
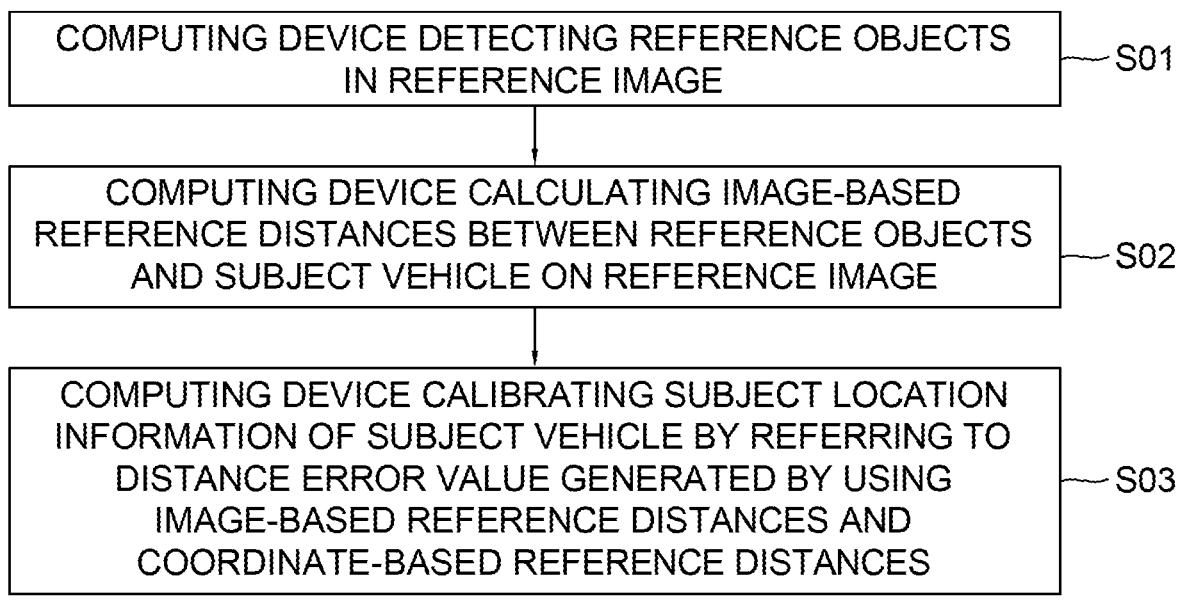
FIG. 2 is a drawing schematically illustrating a flow of the method for the ego-vehicle localization by using the V2X information fusion in accordance with one example embodiment of the present disclosure.

FIG. 2 is a drawing schematically illustrating a flow of the method for the ego-vehicle localization by using the V2X information fusion in accordance with one example embodiment of the present disclosure.

By referring to FIG. 2, the flow of the method for the ego-vehicle localization can be seen briefly. First, the computing device 100 may acquire at least one reference image, through at least one camera on the subject vehicle. Then, at a step of S01, the computing device 100 may detect one or more reference objects in the reference image, by applying at least one object detection operation to the reference image. Thereafter, at a step of S02, the computing device 100 may calculate each of one or more image-based reference distances between each of the reference objects and the subject vehicle, by referring to information on each of reference bounding boxes, corresponding to each of the reference objects, on the reference image. Finally, at a step of S03, the computing device 100 may generate at least one distance error value by referring to the image-based reference distances and coordinate-based reference distances to be explained later, and may calibrate subject location information of the subject vehicle by referring to the distance error value.

Below, the method for the ego-vehicle localization will be explained more specifically.

First, if the reference image is acquired through the camera, the computing device 100 may apply the object detection operation thereto, by using a Convolutional Neural Network (CNN) in the computing device 100. In order to explain how the CNN works, FIG. 3 will be referred to.

Figure 3:
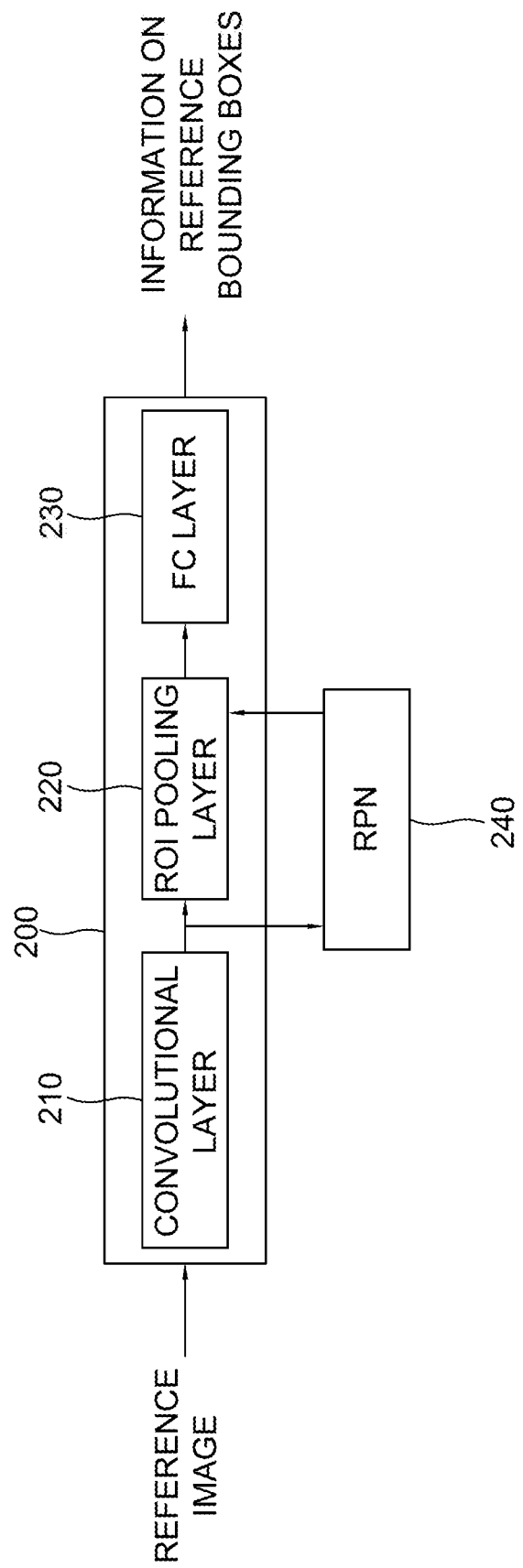
FIG. 3 is a drawing schematically illustrating a configuration of a Convolutional Neural Network (CNN) to be used for performing the method for the ego-vehicle localization by using the V2X information fusion in accordance with one example embodiment of the present disclosure.

FIG. 3 is a drawing schematically illustrating a configuration of a Convolutional Neural Network (CNN) to be used for performing the method for the ego-vehicle localization by using the V2X information fusion in accordance with one example embodiment of the present disclosure.

By referring to FIG. 3, it can be seen that the CNN 200 may include a convolutional layer 210, a Region-Of-Interest (ROI) pooling layer 220 and a Fully-Connected (FC) layer 230 and may interwork with a Region Proposal Network (RPN) 240. Herein, the computing device 100 may instruct the convolutional layer 210 in the CNN 200 to generate a reference feature map by applying at least one convolutional operation to the reference image. Thereafter, the computing device 100 may instruct the RPN 240 to detect one or more reference ROIs on the reference image, where the reference objects are estimated to be located, and may instruct the ROI pooling layer 220 to apply at least one ROI pooling operation to the reference feature map, to thereby pool values corresponding to the reference ROIs on the reference feature map. Then, the computing device 100 may instruct the FC layer 230 to apply at least one FC network operation to the pooled values, to thereby generate location information and class information on each of the reference bounding boxes corresponding to each of the reference objects. By performing such processes, the object detection operation may be performed.

Thereafter, the computing device 100 may calculate each of the image-based reference distances between each of the reference objects and the subject vehicle. Below, how the image-based reference distances can be calculated will be explained.

The computing device 100 may calculate the image-based reference distances by applying at least one image distance estimation operation, which uses information on parameters of the camera, to the reference bounding boxes. Herein, the image distance estimation operation may be differently applied to each of the reference bounding boxes, according to categories where each of the reference objects included therein belongs to.

That is, one or more (1-1)-st specific image-based reference distances, among the image-based reference distances, are generated by applying at least one (1-1)-st specific image distance estimation operation, which further uses (1-1)-st specific reference object height information acquired through V2X communications between the subject vehicle and one or more (1-1)-st specific reference objects among the reference objects, to (1-1)-st specific reference bounding boxes. As an example, the (1-1)-st specific reference objects may be a kind of objects whose heights are larger than a threshold so that they are not flat. According to said example, the (1-1)-st specific reference objects may include at least part of traffic signals, traffic lights and surrounding vehicles located closer than a threshold from the subject vehicle. The (1-1)-st specific image distance estimation operation, corresponding to such (1-1)-st specific reference objects, may be performed by using following formula:

$$D = \frac{f \times VH}{h}$$

Herein, D may denote one of the (1-1)-st specific image-based reference distances, and f may denote a focal length of the camera. Also, VH may denote one piece of the (1-1)-st specific reference object height information corresponding to one of the (1-1)-st specific reference objects, and h may denote an apparent height of said one of the (1-1)-st specific reference objects on the reference image. The apparent height may be acquired by using information on a vertical height of one of the (1-1)-st specific reference bounding boxes including said one of the (1-1)-st specific reference objects. In order to explain such processes of the (1-1)-st specific image distance estimation operation, FIG. 4 will be referred to.

Figure 4:
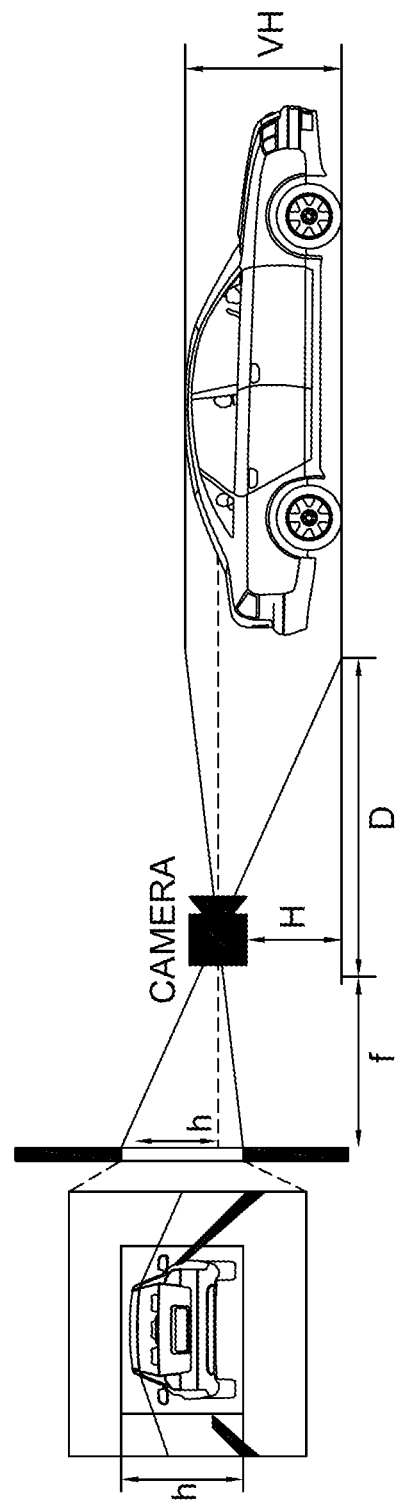
FIG. 4 is a drawing schematically illustrating how distances between the ego-vehicle and surrounding objects can be calculated, wherein the distances are used for performing a method for the ego-vehicle localization by using a V2X information fusion in accordance with one example embodiment of the present disclosure.

FIG. 4 is a drawing schematically illustrating how distances between the ego-vehicle and surrounding objects can be calculated, wherein the distances are used for performing a method for the ego-vehicle localization by using a V2X information fusion in accordance with one example embodiment of the present disclosure.

By referring to FIG. 4, (i) said one piece of the (1-1)-st specific reference object height information corresponding to said one of the (1-1)-st specific reference objects, and (ii) the apparent height, on which said one piece of the (1-1)-st specific reference object height information has been reflected, can be seen. By using such information and values, the (1-1)-st specific image-based reference distances may be calculated. A person in the art may easily understand these processes by further referring to a prior art on an image processing.

And, one or more (1-2)-nd specific image-based reference distances, among the image-based reference distances, may be generated by applying a (1-2)-nd specific image distance estimation operation, which further uses information on a reference point in the reference image, to (1-2)-nd specific reference bounding boxes. Herein, the (1-2)-nd specific image-based reference distances may correspond to one or more (1-2)-nd specific reference objects, and, as an example, those may be a kind of flat objects with height smaller than a threshold. According to the example, the (1-2)-nd specific reference objects may be road markings drawn on a road. And, as an example, the reference point may be a center point of the reference image. Herein, the (1-2)-nd specific image distance estimation operation may be performed by using a following formula:

$$D = \frac{f \times H}{|b - cy|}$$

Herein, D may denote one of the (1-2)-nd specific coordinate-based reference distances, and f may denote a focal length of the camera. Also, H may denote a height of the camera, and |b−cy| may denote an apparent distance, on the reference image, between the reference point and a lower boundary of one of (1-2)-nd specific reference bounding boxes corresponding to one of the (1-2)-nd specific reference objects. By performing the (1-2)-nd specific image distance estimation operation using the above formula, the (1-2)-nd specific image-based reference distances can be generated.

So far how the image-based reference distances can be calculated has been explained. Below, how to calculate the coordinate-based reference distances to be used along with the image-based reference distances will be explained. Herein, each of the coordinate-based reference distances can be calculated differently, by according to categories where each of the reference objects belongs to.

That is, one or more (2-1)-st specific coordinate-based reference distances, among the coordinate-based reference distances, may be generated by referring to the subject location information and (2-1)-st specific reference object location information acquired through V2X communications between the subject vehicle and one or more (2-1)-st specific reference objects among the reference objects. As an example, the (2-1)-st specific reference objects may be a kind of mobile objects such as vehicles, whose information should be updated in real-time. In this case, the computing device 100 may acquire the (2-1)-st specific reference object location information through the V2X communications, and may calculate the (2-1)-st specific coordinate-based reference distances by performing any of distance calculation operations such as the Euclidean distance. However, the (2-1)-st specific reference objects may not be such mobile objects as the case may be. As another example, any objects capable of the V2X communications may be treated as one of the (2-1)-st specific reference objects, to be processed as shown above, to thereby generate its corresponding (2-1)-st specific coordinate-based reference distance. The subject location information may have been acquired through a Global Positioning System (GPS) installed on the subject vehicle.

On the other hand, one or more (2-2)-nd specific coordinate-based reference distances, among the coordinate-based reference distances, may be generated by referring to the subject location information and (2-2)-nd specific reference object location information which has been acquired from a database. As an example, the (2-2)-nd specific reference objects may be a kind of fixed objects whose information is stored in the database. In this case, locations of the (2-2)-nd specific reference objects do not need to be renewed, thus the information in the database can be used for calculating the (2-2)-nd specific coordinate-based reference distances.

While explaining schemes for generating the image-based reference distances and the coordinate-based reference distances, concepts of the (1-1)-st specific reference objects, the (1-2)-nd specific reference objects, the (2-1)-st specific reference objects and the (2-2)-nd specific reference objects have been introduced. Herein, an arbitrary reference object may be one of the (1-1)-st specific reference objects or the (1-2)-nd specific reference objects, and, at the same time, it may be one of the (2-1)-st specific reference objects or the (2-2)-nd specific reference objects. For example, an example reference object may be one of the (1-1)-st specific reference objects, and also be one of the (2-2)-nd specific reference objects. To be simple, each of the reference objects can be classified into the (1-1)-st specific reference objects and the (1-2)-nd specific reference objects by using a first criteria on how it is processed to generate its corresponding image-based reference distance and classified into the (2-1)-st specific reference objects and the (2-1)-st specific reference objects by using a second criteria on how it is processed to generate its corresponding coordinate-based reference distance. Accordingly, the first criteria and the second criteria are independent to each other.

After the image-based reference distances and the coordinate-based reference distances are calculated, the computing device 100 may generate the distance error value by referring thereto, using a following formula:

$$Error_D = \sum_{k=1}^{N} w_k (D_{i_k} - D_{c_k})^2$$

Herein $D_{i_k}$ may denote one of the image-based reference distances corresponding to a k-th reference object among the reference objects, and $D_{c_k}$ may denote one of the coordinate-based reference distances corresponding to the k-th reference object. Also, $w_k$ may denote a weight for the k-th object, and N may denote the number of the reference objects.

After the distance error value is generated, the computing device 100 may calibrate the subject location information by referring to the distance error value. Since the coordinate-based reference distance is generated by referring to the subject location information, which has been detected by the GPS at first, in case the subject location information is incorrect, the distance error value may be larger than a proper one. In such case, the computing device 100 may adjust the subject location information, and re-calculate the distance error value by using the adjusted subject location information. If the re-calculated distance error value has become smaller, the computing device 100 may keep adjusting the subject location information as it has done before. If the re-calculated distance error value has become larger, the computing device 100 may adjust the subject location information oppositely, comparing to what it has done before. A person in the art may be able to understand such processes, since those may be similar to processes of prior arts on a regression, such as the well-known Gradient-Descent.

After the subject location information is calibrated, if the subject vehicle is used for updating the HD Map, while storing update information to be used for updating the HD Map, the computing device 100 may record information on locations where the update information has been acquired, by referring to the calibrated subject location information. Herein, the update information may be related to circumstances around the subject vehicle, and may have been acquired through at least one camera or at least one sensor, while the subject vehicle drives its assigned routes. Said reference image is used for calibrating the subject location information, thus it may not be related to the update information, but a scope of the present disclosure may not be limited to this.

On the other hand, in case the subject vehicle is the autonomous vehicle using the HD Map, the computing device 100 may calculate a location, on the HD Map, of the subject vehicle by referring to the calibrated subject location information, and may acquire information, from the HD Map, on one or more objects located closer than a threshold from the subject vehicle, to thereby support an autonomous driving of the subject vehicle.

By using the method for ego-vehicle localization as shown above, the HD Map may be generated more correctly, and the autonomous driving using the HD Map may be performed more safely.

The present disclosure has an effect of providing the method for a localization of an ego-vehicle for updating an HD Map by using a V2X information fusion, to thereby calculate a more precise location of the ego-vehicle, which allows information acquired by the ego-vehicle to be mapped onto the HD Map more correctly.

The present disclosure has another effect of providing the method for a localization of an autonomous vehicle performing an autonomous driving by using the HD Map, to thereby calculate a more precise location of the autonomous vehicle, which allows the autonomous driving to be performed more properly.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present disclosure has been explained by specific matters such as detailed components, limited embodiments, and drawings. They have been provided only to help more general understanding of the present invention. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for calculating exact location of a subject vehicle by using information on relative distances, comprising steps of:
   (a) a computing device, which interworks with the subject vehicle, if at least one reference image is acquired through at least one camera on the subject vehicle, detecting one or more reference objects in the reference image, by applying at least one object detection operation to the reference image;
   (b) the computing device calculating each of one or more image-based reference distances between each of the reference objects and the subject vehicle, by referring to information on each of reference bounding boxes, corresponding to each of the reference objects, on the reference image; and (c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the step of (c), the computing device generates the distance error value by using a following formula:

$$Error_D = \sum_{k=1}^{N} w_k (D_{i_k} - D_{c_k})^2$$

wherein $D_{i_k}$ denotes one of the image-based reference distances corresponding to a k-th reference object among the reference objects, $D_{c_k}$ denotes one of the coordinate-based reference distances corresponding to the k-th reference object, $w_k$ denotes a weight for the k-th object, and N denotes the number of the reference objects.

2. A method for calculating exact location of a subject vehicle by using information on relative distances, comprising steps of:

(a) a computing device, which interworks with the subject vehicle, if at least one reference image is acquired through at least one camera on the subject vehicle, detecting one or more reference objects in the reference image, by applying at least one object detection operation to the reference image;

(b) the computing device calculating each of one or more image-based reference distances between each of the reference objects and the subject vehicle, by referring to information on each of reference bounding boxes, corresponding to each of the reference objects, on the reference image; and (c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the step of (b), the computing device calculates the image-based reference distances by applying at least one image distance estimation operation, which uses information on parameters of the camera, to the reference bounding boxes, and wherein (i) one or more (1-1)-st specific image-based reference distances, among the image-based reference distances, are generated by applying at least one (1-1)-st specific image distance estimation operation, which further uses (1-1)-st specific reference object height information acquired through V2X communications between the subject vehicle and one or more (1-1)-st specific reference objects among the reference objects, to (1-1)-st specific reference bounding boxes, and (ii) one or more (1-2)-nd specific image-based reference distances, among the image-based reference distances, are generated by applying at least one (1-2)-nd specific image distance estimation operation, which further uses information on a reference point in the reference image, to (1-2)-nd specific reference bounding boxes.

3. The method of claim 2, wherein the (1-1)-st specific image distance estimation operation is performed by using a following formula:

$$D = \frac{f \times VH}{h}$$

wherein D denotes one of the (1-1)-st specific image-based reference distances, f denotes a focal length of the camera, VH denotes a piece of the (1-1)-st specific reference object height information corresponding to one of the (1-1)-st specific reference objects, and h denotes an apparent height of said one of the (1-1)-st specific reference objects on the reference image.

4. The method of claim 2, wherein the (1-2)-nd specific image distance estimation operation is performed by using a following formula:

$$D = \frac{f \times H}{|b - cy|}$$

wherein D denotes one of the (1-2)-nd specific coordinate-based reference distances, f denotes a focal length of the camera, H denotes a height of the camera, and $|b-cy|$ denotes an apparent distance, on the reference image, between the reference point and a lower boundary of one of the (1-2)-nd specific reference bounding boxes corresponding to one of (1-2)-nd specific reference objects.

5. A method for calculating exact location of a subject vehicle by using information on relative distances, comprising steps of:

(a) a computing device, which interworks with the subject vehicle, if at least one reference image is acquired through at least one camera on the subject vehicle, detecting one or more reference objects in the reference image, by applying at least one object detection operation to the reference image;

(b) the computing device calculating each of one or more image-based reference distances between each of the reference objects and the subject vehicle, by referring to information on each of reference bounding boxes, corresponding to each of the reference objects, on the reference image; and (c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein (i) one or more (2-1)-st specific coordinate-based reference distances, among the coordinate-based reference distances, are generated by referring to the subject location information and (2-1)-st specific reference object location information acquired through V2X communications between the subject vehicle and one or more (2-1)-st specific reference objects among the reference objects, and (ii) one or more (2-2)-nd specific coordinate-based reference distances, among the coordinate-based reference distances, are generated by referring to the subject location information and (2-2)-nd specific reference object location information which has been acquired from a database.

6. A method for calculating exact location of a subject vehicle by using information on relative distances, comprising steps of:
(a) a computing device, which interworks with the subject vehicle, if at least one reference image is acquired through at least one camera on the subject vehicle, detecting one or more reference objects in the reference image, by applying at least one object detection operation to the reference image;
(b) the computing device calculating each of one or more image-based reference distances between each of the reference objects and the subject vehicle, by referring to information on each of reference bounding boxes, corresponding to each of the reference objects, on the reference image; and
(c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the step of (a), the computing device applies the object detection operation to the reference image by instructing a Convolutional Neural Network (CNN) to apply at least one convolutional operation, at least one Region-Of-Interest (ROI) pooling operation and at least one Fully-Connected (FC) network operation to the reference image in an order thereof.

7. A method for calculating exact location of a subject vehicle by using information on relative distances, comprising steps of:
(a) a computing device, which interworks with the subject vehicle, if at least one reference image is acquired through at least one camera on the subject vehicle, detecting one or more reference objects in the reference image, by applying at least one object detection operation to the reference image;
(b) the computing device calculating each of one or more image-based reference distances between each of the reference objects and the subject vehicle, by referring to information on each of reference bounding boxes, corresponding to each of the reference objects, on the reference image; and
(c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the step of (c), the computing device calibrates the subject location information to generate calibrated subject location information which makes its corresponding distance error value smallest, by repeating processes of (i) adjusting the subject location information, (ii) re-calculating the distance error value by using the adjusted subject location information, and (iii) re-adjusting the adjusted subject location information by referring to information on whether the re-calculated distance error value has become smaller or not.

8. A method for calculating exact location of a subject vehicle by using information on relative distances, comprising steps of:
(a) a computing device, which interworks with the subject vehicle, if at least one reference image is acquired through at least one camera on the subject vehicle, detecting one or more reference objects in the reference image, by applying at least one object detection operation to the reference image;
(b) the computing device calculating each of one or more image-based reference distances between each of the reference objects and the subject vehicle, by referring to information on each of reference bounding boxes, corresponding to each of the reference objects, on the reference image; and
(c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the step of (c), the computing device, while storing update information to be used for updating a High-Definition Map (HD Map), records information on locations where the update information has been acquired, by referring to the calibrated subject location information.

9. A method for calculating exact location of a subject vehicle by using information on relative distances, comprising steps of:
(a) a computing device, which interworks with the subject vehicle, if at least one reference image is acquired through at least one camera on the subject vehicle, detecting one or more reference objects in the reference image, by applying at least one object detection operation to the reference image;
(b) the computing device calculating each of one or more image-based reference distances between each of the reference objects and the subject vehicle, by referring to information on each of reference bounding boxes, corresponding to each of the reference objects, on the reference image; and
(c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein the reference objects include at least part of (i) one or more mobile objects capable of a V2X communication and (ii) one or more fixed objects, (ii-1) which are capable of the V2X communication or (ii-2) whose information is stored in a database, and
wherein the reference objects include at least part of one or more traffic signs, one or more traffic lights, one or more road markings and one or more surrounding vehicles located closer than a threshold from the subject vehicle.

10. A method for calculating exact location of a subject vehicle by using information on relative distances, comprising steps of:

(a) a computing device, which interworks with the subject vehicle, if at least one reference image is acquired through at least one camera on the subject vehicle, detecting one or more reference objects in the reference image, by applying at least one object detection operation to the reference image;

(b) the computing device calculating each of one or more image-based reference distances between each of the reference objects and the subject vehicle, by referring to information on each of reference bounding boxes, corresponding to each of the reference objects, on the reference image; and (c) the computing device, if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the step of (c), the computing device calculates a location, on a High-Definition Map (HD Map), of the subject vehicle by referring to the calibrated subject location information, and acquires information, from the HD Map, on one or more objects located closer than a threshold from the subject vehicle, to thereby support an autonomous driving of the subject vehicle.

11. A device for calculating exact location of a subject vehicle by using information on relative distances, comprising:

at least one memory that stores instructions; and at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the process of (III), the processor generates the distance error value by using a following formula:

$$Error_D = \sum_{k=1}^{N} w_k (D_{i_k} - D_{c_k})^2$$

wherein $D_{i_k}$ denotes one of the image-based reference distances corresponding to a k-th reference object among the reference objects, $D_{c_k}$ denotes one of the coordinate-based reference distances corresponding to the k-th reference object, $w_k$ denotes a weight for the k-th object, and N denotes the number of the reference objects.

12. A device for calculating exact location of a subject vehicle by using information on relative distances, comprising:

at least one memory that stores instructions; and at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the process of (II), the processor calculates the image-based reference distances by applying at least one image distance estimation operation, which uses information on parameters of the camera, to the reference bounding boxes, and wherein (i) one or more (1-1)-st specific image-based reference distances, among the image-based reference distances, are generated by applying at least one (1-1)-st specific image distance estimation operation, which further uses (1-1)-st specific reference object height information acquired through V2X communications between the subject vehicle and one or more (1-1)-st specific reference objects among the reference objects, to (1-1)-st specific reference bounding boxes, and (ii) one or more (1-2)-nd specific image-based reference distances, among the image-based reference distances, are generated by applying at least one (1-2)-nd specific image distance estimation operation, which further uses information on a reference point in the reference image, to (1-2)-nd specific reference bounding boxes.

13. The device of claim 12, wherein the (1-1)-st specific image distance estimation operation is performed by using a following formula:

$$D = \frac{f \times VH}{h}$$

wherein D denotes one of the (1-1)-st specific image-based reference distances, f denotes a focal length of the camera, VH denotes a piece of the (1-1)-st specific reference object height information corresponding to one of the (1-1)-st specific reference objects, and h denotes an apparent height of said one of the (1-1)-st specific reference objects on the reference image.

14. The device of claim 12, wherein the (1-2)-nd specific image distance estimation operation is performed by using a following formula:

$$D = \frac{f \times H}{|b - cy|}$$

wherein D denotes one of the (1-2)-nd coordinate-based reference distances, f denotes a focal length of the camera, H denotes a height of the camera, and |b−cy| denotes an apparent distance, on the reference image, between the reference point and a lower boundary of one of (1-2)-nd specific reference bounding boxes corresponding to one of (1-2)-nd specific reference objects.

15. A device for calculating exact location of a subject vehicle by using information on relative distances, comprising:

at least one memory that stores instructions; and
at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein (i) one or more (2-1)-st specific coordinate-based reference distances, among the coordinate-based reference distances, are generated by referring to the subject location information and (2-1)-st specific reference object location information acquired through V2X communications between the subject vehicle and one or more (2-1)-st specific reference objects among the reference objects, and (ii) one or more (2-2)-nd specific coordinate-based reference distances, among the coordinate-based reference distances, are generated by referring to the subject location information and (2-2)-nd specific reference object location information which has been acquired from a database.

16. A device for calculating exact location of a subject vehicle by using information on relative distances, comprising:

at least one memory that stores instructions; and
at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the process of (I), the processor applies the object detection operation to the reference image by instructing a Convolutional Neural Network (CNN) to apply at least one convolutional operation, at least one Region-Of-Interest (ROI) pooling operation and at least one Fully-Connected (FC) network operation to the reference image in an order thereof.

17. A device for calculating exact location of a subject vehicle by using information on relative distances, comprising:

at least one memory that stores instructions; and
at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the process of (III), the processor calibrates the subject location information to generate calibrated subject location information which makes its corresponding distance error value smallest, by repeating processes of (i) adjusting the subject location information, (ii) re-calculating the distance error value by using the adjusted subject location information, and (iii) re-adjusting the adjusted subject location information by referring to information on whether the re-calculated distance error value has become smaller or not.

18. A device for calculating exact location of a subject vehicle by using information on relative distances, comprising:

at least one memory that stores instructions; and
at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;
wherein, at the process of (III), the processor, while storing update information to be used for updating a High-Definition Map (HD Map), records information on locations where the update information has been acquired, by referring to the calibrated subject location information.

19. A device for calculating exact location of a subject vehicle by using information on relative distances, comprising:

at least one memory that stores instructions; and
at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein the reference objects include at least part of (i) one or more mobile objects capable of a V2X communication and (ii) one or more fixed objects, (ii-1) which are capable of the V2X communication or (ii-2) whose information is stored in a database, and wherein the reference objects include at least part of one or more traffic signs, one or more traffic lights, one or more road markings and one or more surrounding vehicles located closer than a threshold from the subject vehicle.

20. A device for calculating exact location of a subject vehicle by using information on relative distances, comprising:

at least one memory that stores instructions; and at least one processor configured to execute the instructions to perform processes of: (I) if at least one reference image is acquired through at least one camera on the subject vehicle, detecting one or more reference objects in the reference image, by applying at least one object detection operation to the reference image; (II) calculating each of one or more image-based reference distances between each of the reference objects and the subject vehicle, by referring to information on each of reference bounding boxes, corresponding to each of the reference objects, on the reference image; and (III) if each of one or more coordinate-based reference distances between each of the reference objects and the subject vehicle is acquired, (i) generating at least one distance error value by referring to the image-based reference distances and the coordinate-based reference distances, and (ii) calibrating subject location information of the subject vehicle by referring to the distance error value;

wherein, at the process of (III), the processor calculates a location, on a High-Definition Map (HD Map), of the subject vehicle by referring to the calibrated subject location information, and acquires information, from the HD Map, on one or more objects located closer than a threshold from the subject vehicle, to thereby support an autonomous driving of the subject vehicle.

\* \* \* \* \*